United States Patent
Yokoi et al.

(10) Patent No.: US 6,516,612 B1
(45) Date of Patent: Feb. 11, 2003

(54) EXHAUST GAS PURIFICATION DEVICE FOR AN ENGINE AND A/F RATIO CONTROL FOR EARLY ACTIVATING A NOX TRAPPING CATALYST

(75) Inventors: Tarou Yokoi, Kanagawa (JP); Hirofumi Tsuchida, Kanagawa (JP); Keiji Okada, Kanagawa (JP); Kouji Ishihara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/495,938

(22) Filed: Feb. 2, 2000

(30) Foreign Application Priority Data

Feb. 3, 1999 (JP) .......................... 11-025659

(51) Int. Cl.[7] ............................... F01N 3/10
(52) U.S. Cl. .................. 60/301; 60/274; 60/285; 60/286
(58) Field of Search ................. 60/285, 286, 301, 60/274, 295; 123/443

(56) References Cited

U.S. PATENT DOCUMENTS

| | | | |
|---|---|---|---|
| 5,388,403 A | | 2/1995 | Nagami et al. |
| 5,473,887 A | | 12/1995 | Takeshima et al. |
| 5,657,625 A | * | 8/1997 | Koga et al. ............ 60/285 |
| 5,749,221 A | * | 5/1998 | Kawahira et al. ....... 60/274 |
| 5,758,493 A | * | 6/1998 | Asik et al. ............. 60/274 |
| 5,771,685 A | * | 6/1998 | Hepburn ............... 60/274 |
| 5,778,667 A | * | 7/1998 | Kinugasa et al. ....... 60/301 |
| 5,970,707 A | * | 10/1999 | Sawada et al. ........ 60/285 |
| 5,974,793 A | * | 11/1999 | Kinugasa et al. ....... 60/285 |
| 5,983,627 A | * | 11/1999 | Asik ................... 60/285 |
| 6,014,859 A | * | 1/2000 | Yoshizaki et al. ...... 60/285 |
| 6,109,024 A | * | 8/2000 | Kinugasa et al. ....... 60/285 |
| 6,119,452 A | * | 9/2000 | Kinugasa et al. ....... 60/285 |
| 6,138,453 A | * | 10/2000 | Sawada et al. ........ 60/285 |
| 6,205,773 B1 | * | 3/2001 | Suzuki ................ 60/286 |
| 6,250,074 B1 | * | 6/2001 | Suzuki et al. ......... 60/285 |
| 6,289,672 B1 | * | 9/2001 | Katoh et al. .......... 60/285 |

FOREIGN PATENT DOCUMENTS

| | | | |
|---|---|---|---|
| JP | 11-117786 | * | 4/1999 |
| JP | 2000-18025 | * | 1/2000 |
| JP | 2000-64826 | * | 2/2000 |
| JP | 2000-356125 | * | 12/2000 |

* cited by examiner

Primary Examiner—Thomas Denion
Assistant Examiner—Tu M. Nguyen
(74) Attorney, Agent, or Firm—Foley & Lardner (57) ABSTRACT

An exhaust gas purification device including three-way catalysts connected to engine cylinder groups and arranged in parallel, and a NOx trapping catalyst connected with the three-way catalysts downstream thereof. A controller controls fuel injection for making an A/F ratio of exhaust gas flowing into one of the three-way catalysts rich relative to a stoichiometric A/F ratio when it is required to reduce the NOx trapped by the NOx trapping catalyst.

26 Claims, 6 Drawing Sheets

EXHAUST GAS PURIFICATION DEVICE FOR AN ENGINE AND A/F RATIO CONTROL FOR EARLY ACTIVATING A NOX TRAPPING CATALYST

FIELD OF THE INVENTION

This invention relates to an exhaust gas purification device for an internal combustion engine and, more particularly, to the device for purifying nitrogen oxide (NOx) generated during a lean burn engine operation. The invention also relates to an air-fuel (A/F) ratio control for early activating a NOx trapping catalyst used in the exhaust gas purification device.

BACKGROUND OF THE INVENTION

Recently, lean burn engines operable with a lean A/F ratio higher than a stoichiometric A/F ratio have been regarded effective from viewpoints of improvement in fuel economy and reduction of carbon dioxide ($CO_2$) present in exhaust gas emitted from the engines. Exhaust generated from the lean burn engines has a high content of oxygen, whereby a generally used three-way catalyst cannot sufficiently reduce NOx present in the exhaust. There is a demand to provide a technique for effectively removing the NOx during the lean A/F ratio operation of the engine.

U.S. Pat. No. 5,473,887 discloses an exhaust gas purification device using a NOx trapping catalyst that is operative to trap NOx present in exhaust gas flowing into the NOx trapping catalyst when an A/F ratio of the exhaust gas is lean and reduce the NOx present in the exhaust gas when the A/F ratio of the exhaust gas becomes rich. In this device, the NOx trapping catalyst traps the NOx present in the exhaust gas emitted from the engine during the lean A/F ratio operation and the NOx trapped by the NOx trapping catalyst is reduced by temporarily operating the engine with the rich A/F ratio at a predetermined timing.

Meanwhile, when the engine is under the fully warm-up condition, the three-way catalyst and the NOx trapping catalyst are sufficiently heated to effectively purify the exhaust gas. When the engine is not under the fully warm-up condition, for instance, immediately after the starting up, the three-way catalyst and the NOx trapping catalyst do not reach the sufficiently heated state. This leads to considerable difficulty in purifying the exhaust gas. There have been proposed various techniques for activating the catalysts for a shorter period of time. One of the techniques is to arrange the catalyst in the exhaust system near an exhaust port of the engine. Namely, if the catalyst is located further upstream in the exhaust system, the heat of the exhaust gas emitted from the engine can be introduced into the catalyst without being transmitted to other parts of the exhaust system so that the catalyst can be activated for the shorter period of time.

Thus, in order to early commence the reduction of the NOx by the NOx trapping catalyst in the lean burn engine, it is desirable to arrange the NOx trapping catalyst near the exhaust port of the engine. On the other hand, generally, the NOx trapping catalyst has a heat resistance lower than that of the three-way catalyst. In some cases, the NOx trapping catalyst has a lower operating temperature range in which the trapping and reduction of the NOx can be achieved with high efficiency, as compared with a temperature of the exhaust gas near the exhaust port of the engine. Considering these characteristics of the NOx trapping catalyst, it will be undesirable to locate the NOx trapping catalyst near the exhaust port of the engine.

U.S. Pat. No. 5,388,403 discloses such an arrangement that the three-way catalyst is located upstream of the exhaust system and the NOx trapping catalyst is arranged downstream of the three-way catalyst. In this arrangement, the A/F ratio in a combustion chamber of an engine cylinder is made rich for providing stable combustion upon the staring up of the engine and the A/F ratio of the exhaust gas is made lean by introducing a secondary air from the upstream side of the three-way catalyst to promote the activation of the catalysts. The upstream three-way catalyst oxidizes hydrocarbon (HC) and carbon oxide (CO) present in the exhaust gas and the downstream NOx trapping catalyst traps the NOx present in the exhaust gas. When an amount of the NOx trapped by the NOx trapping catalyst reaches a predetermined value, the A/F ratio of the exhaust gas is made rich so as to reduce the NOx trapped in the NOx trapping catalyst.

SUMMARY OF THE INVENTION

In the conventionally proposed arrangement including the upstream three-way catalyst and the downstream NOx trapping catalyst, the exhaust gas having the A/F ratio made rich for the reduction of the NOx trapped by the NOx trapping catalyst is first introduced into the three-way catalyst. The HC and CO present in the exhaust gas react with the oxygen trapped by the three-way catalyst. The A/F ratio of the exhaust gas does not reach the rich ratio at an outlet port of the three-way catalyst until a whole amount of the oxygen in the three-way catalyst is consumed for the reaction with the HC and CO in the exhaust gas. Namely, the NOx present in the exhaust gas flowing into the NOx trapping catalyst cannot be reduced by the NOx trapping catalyst until the reaction of the whole amount of the oxygen is completed. It, therefore, will be required to supply the exhaust system with the exhaust gas with a fully rich A/F ratio that contains a sufficient amount of the reducing agent, i.e., HC and CO, to be used in the reaction with the oxygen in the three-way catalyst. This leads to decrease in fuel economy.

The three-way catalyst acts, because of its oxygen trapping property, to trap the oxygen present in the exhaust gas flowing thereinto when the exhaust gas is lean, and to oxidize the HC and CO present in the exhaust gas flowing thereinto by the trapped oxygen when the exhaust gas is rich. In order to lower the oxygen trapping property of the three-way catalyst for making the A/F ratio of the exhaust gas flowing into the NOx trapping catalyst rich, socalled ceria, i.e., cerium oxide ($CeO_2$), generally carried by the three-way catalyst may be removed therefrom. However, if the oxygen trapping property of the three-way catalyst is lowered, then it will be undesirably caused to decrease the oxidation rate of the HC and CO present in the exhaust gas with the rich A/F ratio. Further, the oxygen trapping property of the three-way catalyst cannot be lowered to zero even if the ceria is removed from the three-way catalyst. This is because catalyst components other than the ceria can trap a certain amount of the oxygen present in the exhaust gas.

It is an object of the present invention to provide an exhaust gas purification device having catalysts parallel located and respectively connected to engine cylinder groups, and a NOx trapping catalyst located downstream of the catalysts, wherein the NOx present in the exhaust gas flowing into the NOx trapping catalyst can be reduced by making the exhaust gas flowing into one of the catalysts rich.

According to one aspect of the present invention, there is provided an exhaust gas purification device for an engine, comprising:

a first front catalyst disposed in a first exhaust passage connected to a first cylinder group, said first front catalyst being adapted to trap oxygen present in exhaust gas flowing thereinto when an air-fuel ratio of the exhaust gas is lean relative to a stoichiometric air-fuel ratio and oxidize a reducing agent present in the exhaust gas by the oxygen trapped thereby when the air-fuel ratio of the exhaust gas is rich relative to the stoichiometric air-fuel ratio;

a second front catalyst disposed in a second exhaust passage connected to a second cylinder group, said second front catalyst being adapted to trap oxygen present in exhaust gas flowing thereinto when an air-fuel ratio of the exhaust gas is lean relative to the stoichiometric air-fuel ratio and oxidize the reducing agent present in the exhaust gas by the oxygen trapped thereby when the air-fuel ratio of the exhaust gas is rich relative to the stoichiometric air-fuel ratio;

a rear catalyst disposed in a rear exhaust passage which combines the exhaust of the first and second exhaust passages, said rear catalyst being adapted to trap nitrogen oxides (NOx) present in exhaust gas flowing thereinto when an air-fuel ratio of the exhaust gas is lean relative to the stoichiometric air-fuel ratio and reduce the NOx trapped thereby by the reducing agent present in the exhaust gas when the air-fuel ratio of the exhaust gas is rich relative to the stoichiometric air-fuel ratio; and a controller programmed to make the air-fuel ratio of the exhaust gas flowing into the first front catalyst rich relative to the stoichiometric air-fuel ratio and make the air-fuel ratio of the exhaust gas flowing into the second front catalyst stoichiometric or lean relative to the stoichiometric air-fuel ratio when the NOx trapped by the rear catalyst is reduced.

According to a further aspect of the present invention, there is provided an engine with an exhaust gas purification device, comprising:

a plurality of engine cylinders divided into a first cylinder group and a second cylinder group;

a first exhaust passage connected to the first cylinder group;

a second exhaust passage connected to the second cylinder group;

a common exhaust passage merging the first and second exhaust passages and disposed downstream thereof;

a first catalyst disposed in the first exhaust passage;

a second catalyst disposed in the second exhaust passage;

a nitrogen oxide (NOx) trapping catalyst disposed in the common exhaust passage;

fuel injectors connected to the engine cylinders; and a controller connected to the fuel injectors and programmed to control fuel injection for making an air-fuel ratio of exhaust gas flowing into the first catalyst rich relative to a stoichiometric air-fuel ratio.

According to a still further aspect of the present invention, there is provided a method for controlling an air-fuel ratio of exhaust gas generated from engine cylinders and flowing into catalysts arranged in parallel upstream of a nitrogen oxide (NOx) trapping catalyst, said catalysts being operative to trap oxygen present in the exhaust gas flowing thereinto and oxidize a reducing agent present in the exhaust gas by the trapped oxygen, said method comprising:

calculating a basic injection fuel amount required to be injected into each engine cylinder for making an air-fuel ratio of an air-fuel mixture to be combusted a stoichiometric air-fuel ratio;

determining an optimal ignition timing based on the basic injection fuel amount calculated; and calculating an additional injection fuel amount required to be injected into a predetermined engine cylinder at a predetermined period of time for making an air-fuel ratio of the exhaust gas generated from the predetermined engine cylinder and flowing into the NOx trapping catalyst rich.

DETAILED DESCRIPTION OF THE INVENTION

Referring now to FIGS. 1 to 5, a first embodiment of an exhaust gas purification device and an internal combustion engine having the exhaust gas purification device, according to the present invention is explained. The internal combustion engine is of an in-cylinder direct-injection type.

Figure 1:
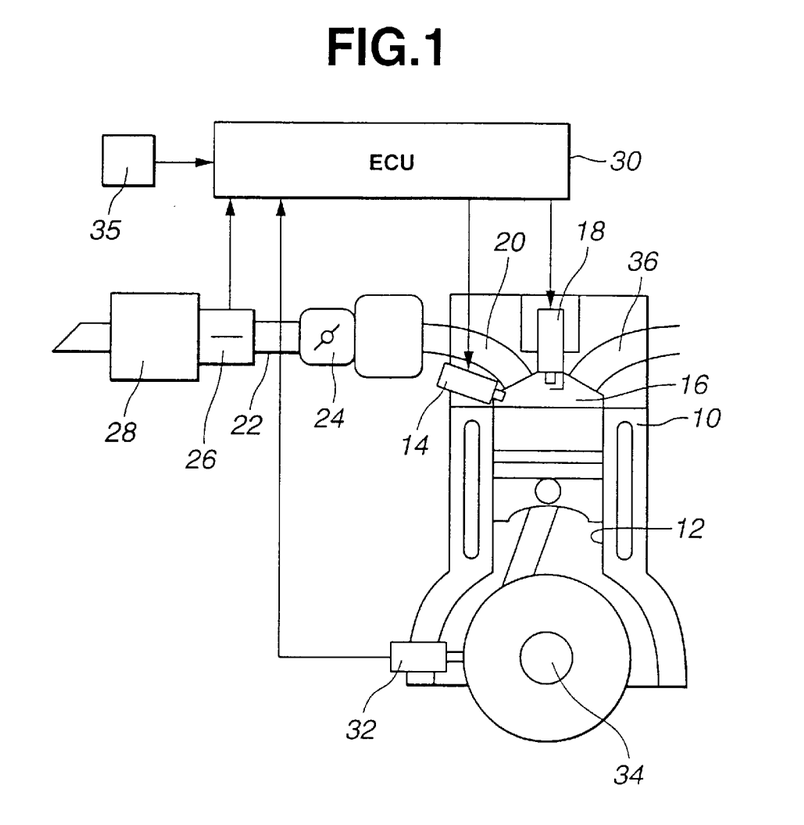
FIG. 1 is a schematic diagram illustrating an internal combustion engine, showing a part of a device of the present invention.

As illustrated in FIG. 1, the engine 10 includes an engine cylinder 12. While only one engine cylinder 12 is shown in FIG. 1 for brief illustration, the engine 10 includes a plurality of engine cylinders. In this embodiment, the engine 10 is of the in-line four-cylinder type as explained later. A fuel injector 14 is arranged to inject fuel into a combustion chamber 16 of each engine cylinder 12. A spark plug 18 is disposed at a top-central part of the combustion chamber 16. An intake-air passage 22 is connected to an intake port 20 open into the combustion chamber 16. A throttle valve 24 is arranged in the intake-air passage 22. An air flow meter 26 and an intake-air cleaner 28 are arranged in the intake-air passage 22 upstream of the throttle valve 24. The air flow meter 26 is adapted to detect an intake-air amount Q introduced into the engine 10 and generate an output signal indicative of the intake-air amount Q. A crank angle sensor 32 is provided for detecting a rotation angle of a crankshaft 34 of the engine 10 and generating an output signal indicative thereof. An engine speed sensor 35 is provided for detecting an engine speed Ne and generating an output signal indicative thereof. The air flow meter 26, the crank angle sensor 32 and the engine speed sensor 35 as well as the fuel injector 14 and the spark plug 18 are connected to a controller 30. The controller 30 receives various output signals generated from the air flow meter 26, the crank angle sensor 32 and the engine speed sensor 35 and the like.

Figure 3:
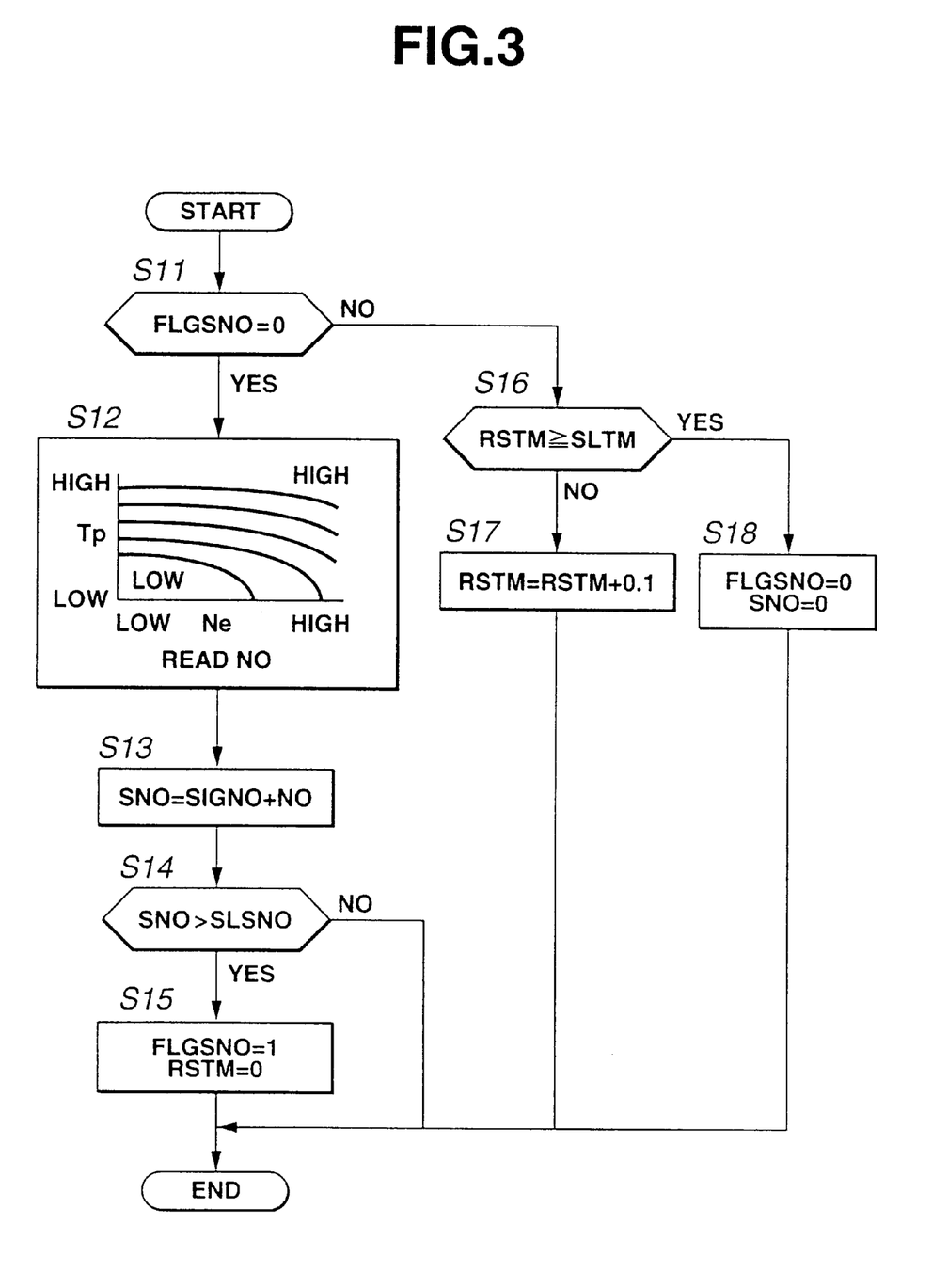
FIG. 3 is a flowchart of a routine executed for a rich spike control in the first embodiment.
Figure 4:
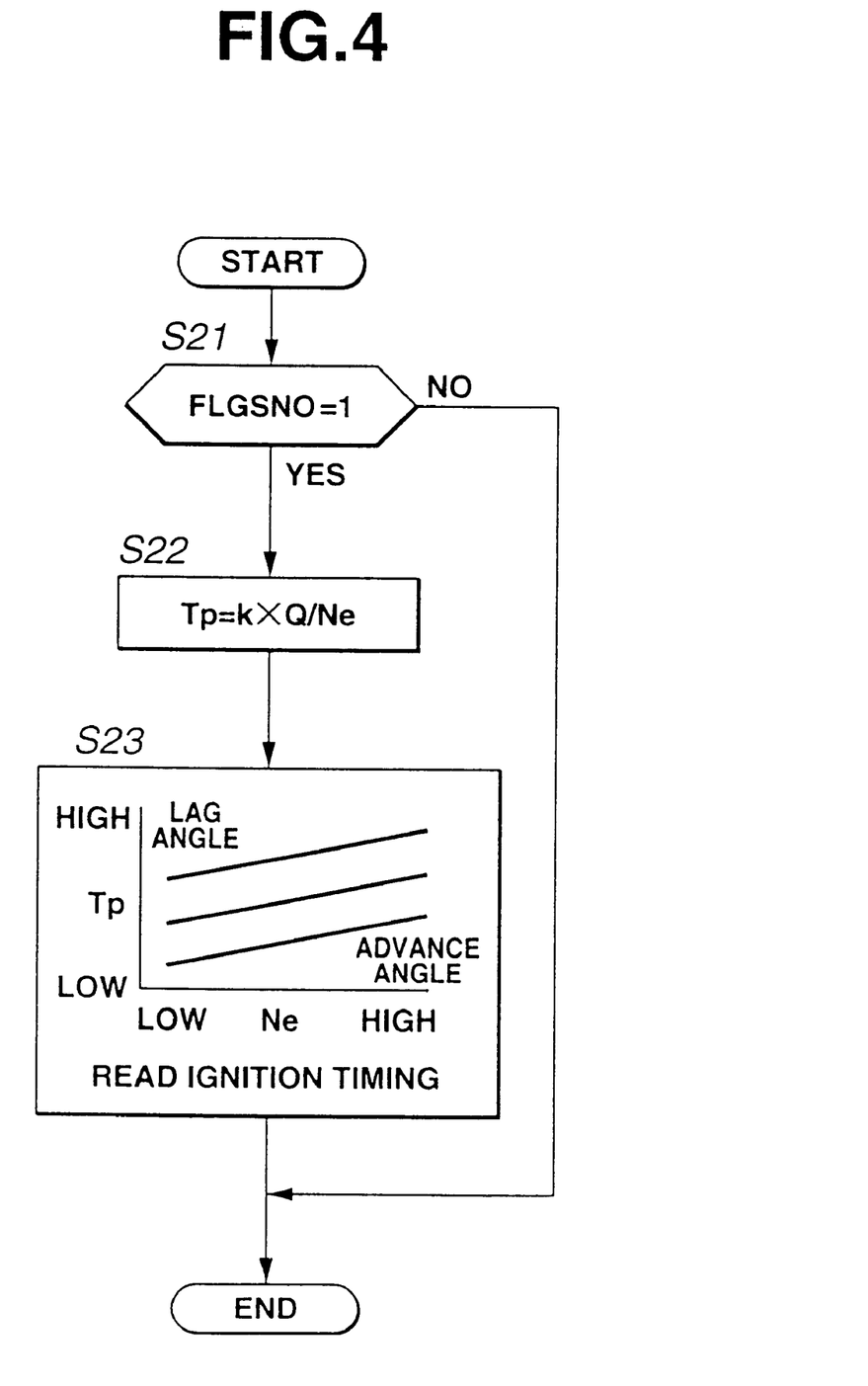
FIG. 4 is a flowchart of a routine executed for determining a basic fuel injection amount upon the rich spike control.
Figure 5:
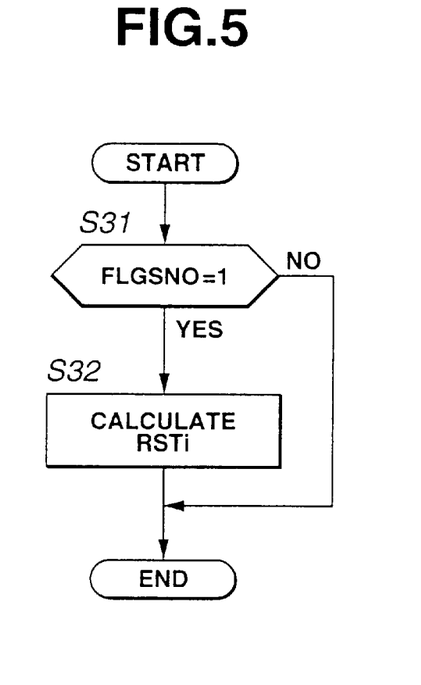
FIG. 5 is a flowchart of a routine executed for determining an additional fuel injection amount upon the rich spike control.

The controller 30 executes routines illustrated in FIGS. 3 to 5 on the basis of the output signals received and operates the fuel injector 14 and the spark plug 18 for controlling an injection fuel amount, an injection timing and an ignition timing. The controller 30 is constituted by a microcomputer including microprocessor unit (MPU), input ports, output ports, read-only memory (ROM) for storing the control program, random access memory (RAM) for temporary data storage which may also be used for timers, keep-alive memory for storing learned values, and a conventional data bus.

Figure 2:
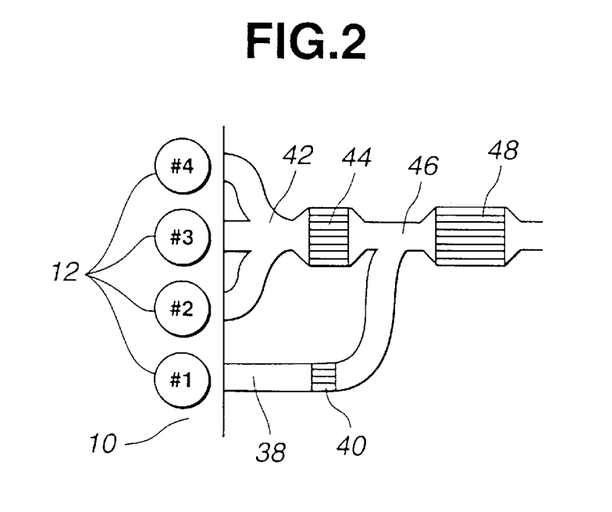
FIG. 2 illustrates a first embodiment of the device, showing catalysts used in the device.

FIG. 2 illustrates an exhaust system connected to an exhaust port 36 of each engine cylinder of the in-line four-cylinder engine 10. As illustrated in FIG. 2, the engine 10 includes four engine cylinders divided into a first cylinder group including an engine cylinder #1 and a second cylinder group including engine cylinders #2, #3 and #4. A first exhaust passage 38 is connected to the engine cylinder #1. A first front catalyst 40 formed by a three-way catalyst is disposed within the first exhaust passage 38. The term "front" used herein means the "upstream" side relative to an exhaust gas flow from each engine cylinder. The first front catalyst 40 has a volumetric capacity capable of permitting a single flow of the exhaust gas generated from the engine cylinder #1 to pass through the first front catalyst 40. A manifold-shaped second exhaust passage 42 having three branches is connected to the engine cylinders #2, #3 and #4 through the three branches. A second front catalyst 44 formed by a three-way catalyst is disposed within the second exhaust passage 42. The second front catalyst 44 has a volumetric capacity greater than that of the first front catalyst 40 so as to permit a combined flow of exhaust gases from the three engine cylinders #2, #3 and #4 to pass through the second front catalyst 44. The first front catalyst 40 has an oxygen trapping property, i.e., an oxidation property, lower than that of the second front catalyst 44. Specifically, the first front catalyst 40 includes an extremely small amount of an auxiliary catalytic component, such as so-called ceria, i.e., cerium oxide ($CeO_2$), which serves for increasing the oxidation property. The first exhaust passage 38 and the second exhaust passage 42 merge downstream of the first and second front catalysts 40 and 44, forming a common exhaust passage 46. A rear catalyst 48 is disposed within the common exhaust passage 46. The term "rear" used herein means the "downstream" side relative to the exhaust gas flow from each engine cylinder.

The rear catalyst 48 is constituted by a NOx trapping catalyst including, for example, a honeycomb-like carrier coated with alumina. At least one. element selected from alkali metals, for instance, potassium (K), sodium (Na), lithium (Li) and cesium (Cs); alkali-earth metals, for instance, barium (Ba) and calcium (Ca); and rare-earth metals, for instance, lanthanum (La) and yttrium (Y), and precious metals such as platinum (Pt) are carried on the carrier. The NOx trapping catalyst 48 is operative to combine NOx present in the exhaust gas flowing thereinto with, for example, barium oxide (BaO) and trap the NOx in the form of nitrate ions ($NO_3^-$) when an A/F ratio of the exhaust gas flowing thereinto is lean with respect to the stoichiometric A/F ratio. The NOx trapping catalyst 48 is also operative to reduce the trapped $NO_3^-$ by a reducing agent, i.e., unburnt HC and CO, present in the exhaust gas flowing thereinto and produce and release $NO_2$ when the A/F ratio of the exhaust gas flowing thereinto is rich with respect to the stoichiometric A/F ratio. When the engine operation continues with the lean A/F ratio and the NOx trapping catalyst 48 is saturated with the $NO_3^-$ by the reaction between BaO and NOx, NOx can be no longer trapped by the NOx trapping catalyst 48. At this time, the A/F ratio of the exhaust gas flowing into the NOx trapping catalyst 48 is forced to shift to rich so as to reduce the trapped $NO_3^-$ and release the $NO_2$.

This temporary control of the A/F ratio of the exhaust gas to the rich side for reduction of the NOx trapped by the NOx trapping catalyst 48 is hereinafter referred to as a rich spike control.

The controller 30 is programmed to control fuel injection for making an A/F ratio of the exhaust gas flowing into the first front catalyst 40 rich relative to the stoichiometric A/F ratio and making an A/F ratio of exhaust gas flowing into the second front catalyst 44 stoichiometric or lean relative to the stoichiometric A/F ratio when the controller 30 determines that the rear NOx trapping catalyst 48 is required to be subjected to the rich spike control.

Referring to FIGS. 3 to 5, operations of the controller 30 will be specifically explained hereinafter.

In FIG. 3, there is shown a rich spike control determination routine repeatedly executed by the controller 30 at intervals of 0.1 second. At block S11, an interrogation is made whether or not a rich spike flag FLGSNO is "0 (zero)". The FLGSNO set at "0" indicates that an amount of the NOx trapped is less than a predetermined value and the rich spike control is inhibited. The predetermined value may be approximately a half of a saturated amount of the NOx that is a maximum amount of the NOx capable being trapped by the rear NOx trapping catalyst 48. The FLGSNO set at "1" indicates that the amount of the NOx trapped by the rear NOx trapping catalyst 48 is not less than the predetermined value and the NOx trapped must be reduced by the rich spike control.

If, at block S11, the interrogation is in affirmative (FLGSNO=0), indicating that the rich spike control is inhibited, the process goes to block S12. At block S12, an amount of the NOx generated from the engine per unit time, for instance, per 0.1 second in this embodiment, is obtained by looking up a predetermined map. The predetermined map is stored in the controller 30, showing the NOx amount generated from the engine per unit time corresponding to an engine load, for example, a basic fuel injection amount Tp, and the engine speed Ne. The basic fuel injection amount Tp is represented by the following formula:

$$Tp = k \times Q/Ne$$

wherein k is a constant.

Then, the routine goes to block S13, at which a sum SNO of the NOx amount trapped by the rear NOx trapping catalyst 48 during the lean ratio operation is updated by adding the current NOx amount NO obtained at block S12 to a previous sum SIGNO of the NOx amount previously calculated at the preceding execution of this routine. Next, at block S14, the sum SNO of the NOx trapped is compared with an upper limit SLSNO, that is, the above-described predetermined value If the sum SNO of the NOx trapped exceeds the upper limit SLSNO, then the process goes to block S15. At block S15, the rich spike flag FLGSNO is set at "1" and at the same time a time RSTM elapsed from the moment the rich spike control is conducted is reset at "0". The elapsed time RSTM is measured by a timer. If, at block S14, the sum SNO of the NOx trapped is not more than the upper limit SLSNO, it is determined that the rear NOx trapping catalyst 48 is still operable for trapping NOx and the lean A/F ratio operation is continued. The lean A/F ratio operation is conducted by execution of a fuel injection control routine, not shown, for providing the fuel injection amount required for the lean A/F ratio at the engine cylinder during the period between the intake and compression strokes.

At block S11, if the interrogation is in negative (FLGSNO=1), it is determined that the rich spike control is permitted. The process goes to block S16. At block 16, an interrogation is made whether or not the elapsed time RSTM is not less than a predetermined value SLTM. If, at block 16, the interrogation is in negative, indicating that the elapsed time RSTM is less than the predetermined value SLTM, the process goes to block S17. At block S17, the elapsed time RSTM is counted up and updated. In this embodiment, the current elapsed time RSTM is updated by adding 0.1 to the previous elapsed time RSTM because this routine is executed every 0.1 second. If the interrogation is in affirmative at block 16, the process goes to block S18. At block S18, the rich spike flag FLGSNO is set at "0" and the sum SNO of the NOx trapped is reset at "0".

FIG. 4 shows a routine executed for determining the basic fuel injection amount Tp required for producing the stoichiometric A/F ratio of an air-fuel mixture within each engine cylinder #1–#4 upon the rich spike control being permitted. The basic injection fuel amount Tp is an amount of fuel to be injected by the fuel injector 14 into the combustion chamber 16 of the engine cylinder #1–#4 at an intake stroke upon the rich spike control being permitted. At block S21, an interrogation is made whether or not the rich spike flag FLGSNO is set at "1". If the interrogation is in negative, indicating that the rich spike control is inhibited, the process goes to end. If the interrogation is in affirmative, indicating that the rich spike control is permitted, the process goes to block S22 and then block S23. At block S22, the basic fuel injection amount Tp is calculated using the above-described equation Tp=k×Q/Ne. At block S23, an optimal ignition timing is determined looking up a map stored in the controller 30. The map uses the engine speed Ne and the engine load Tp as parameters. The basic injection fuel amount Tp obtained at block S22 is to be ignited by the spark ignitor 18 at the optimal ignition timing determined at block S23.

FIG. 5 shows a routine executed for determining an additional fuel injection amount RSTi required for producing a rich A/F ratio of the exhaust gas generated from one of the first and second cylinder groups and flowing into the rear catalyst 48 upon the rich spike control being permitted. The additional fuel injection amount RSTi is an amount of an additional fuel that is to be injected into at least one of the engine cylinders of the one of the first and second cylinder groups at a period from an expansion stroke to an exhaust stroke. In this embodiment, the engine cylinder #1 constituting the first cylinder group is supplied with the additional fuel amount RSTi. The additional fuel amount RSTi is incompletely combusted or not combusted at all and fed to the first front catalyst 40 and the rear catalyst 48. By injecting the additional fuel amount RSTi, the A/F ratio of the exhaust gas generated from the engine cylinder #1 and flowing into the first front catalyst 40 and the rear catalyst 48, is made rich relative to the stoichiometric A/F ratio. At block S31, an interrogation is made whether or not the rich spike flag FLGSNO is set at "1". If the interrogation is in negative, indicating that the rich spike control is inhibited, the process goes to end. If the interrogation is in affirmative, indicating that the rich spike control is permitted, the process goes to block S32. At block S32, the additional fuel injection amount RSTi is calculated using the following formula (1):

$$RSTi = \text{number of engine cylinders} \times Tp \times (\text{stoichiometric A/F ratio} - \text{rich spike A/F ratio})/\text{rich spike A/F ratio} \quad (1)$$

This formula is used in a case where every engine cylinder is operated at the stoichiometric A/F ratio.

If every engine cylinder is operated at the lean A/F ratio, the additional fuel injection amount RSTi is calculated using the following formula (2):

$$RSTi = \text{number of engine cylinders} \times Tp \times \text{stoichiometric A/F ratio} \\ (\text{combustion A/F ratio} - \text{rich spike A/F ratio})/(\text{rich spike A/F ratio} \times \text{combustion A/F ratio}) \quad (2)$$

wherein, combustion A/F ratio is an A/F ratio used in the lean burn operation.

If the A/F ratio formed in every engine cylinder #1–#4 is changed from the lean A/F ratio to the stoichiometric A/F ratio to conduct the rich spike control, slight torque variation will be caused by the rich spike control. On the other hand, if the A/F ratio formed in every engine cylinder #1–#4 is maintained at the lean A/F ratio and the additional fuel is injected into the engine cylinder #1 of the first cylinder group at the period from the expansion stroke to the exhaust stroke, the torque variation will be prevented.

When the rich A/F ratio is produced at the part of the engine cylinders (i.e., the engine cylinder #1 in this embodiment) upon the rich spike control, the NOx trapped by the rear NOx trapping catalyst 48 from the exhaust gas generated from the engine cylinder #1 can be reduced. The additional fuel injection amount RSTi at the engine cylinder #1 which is required for reducing the NOx trapped by the rear catalyst 48, may be very small, serving for saving fuel. The reason therefor is that since the first front catalyst 40 into which the exhaust gas generated from the engine cylinder #1 flows has the small volumetric capacity and the lower oxygen trapping property as explained above, a less amount of fuel is consumed by the reaction with the oxygen trapped by the first front catalyst 40 so that a large amount of unoxidized fuel can be passed into the rear catalyst 48.

Meanwhile, the present invention is not limited to the above embodiment. For example, the rich A/F ratio can be produced by supplying an air-fuel mixture with an A/F ratio richer than the stoichiometric A/F ratio to the rich spike engine cylinder and combusting the air-fuel mixture therein, instead of injecting the additional fuel amount as explained above.

Further, with the arrangement of the first and second front three-way catalysts 40 and 44 upstream of the exhaust system, these catalysts can be quickly made active to commence purification of the exhaust immediately after the engine starting up under cool-down condition. With the arrangement of the rear NOx trapping catalyst 48 downstream of the exhaust system, the rear NOx trapping catalyst 48 can be prevented from heat deterioration thereof, and can use suitably the heat for the effective activation of trap and reduction of the NOx.

Furthermore, since the additional fuel amount is injected into the at least one of the engine cylinders at the period from the expansion stroke to the exhaust stroke and, therefore, is in incompletely combusted or not combusted at all therein, substantially equal torques can be generated at the engine cylinders #1–#4. Further, the injection of the additional fuel amount can easily produce the considerably rich A/F ratio of the exhaust gas generated from the rich spike engine cylinder at which the rich spike control is made, for instance, the engine cylinder #1. This serves for readily activating the rear NOx trapping catalyst 48.

In addition, the first front catalyst 40 having the oxidation property lower than that of the second front catalyst 44 can assist the reduction of the NOx trapped by the rear catalyst 48. This also serves for reducing the additional fuel amount required for producing the rich A/F ratio of the exhaust gas flowing into the rear catalyst 48.

Figure 6:
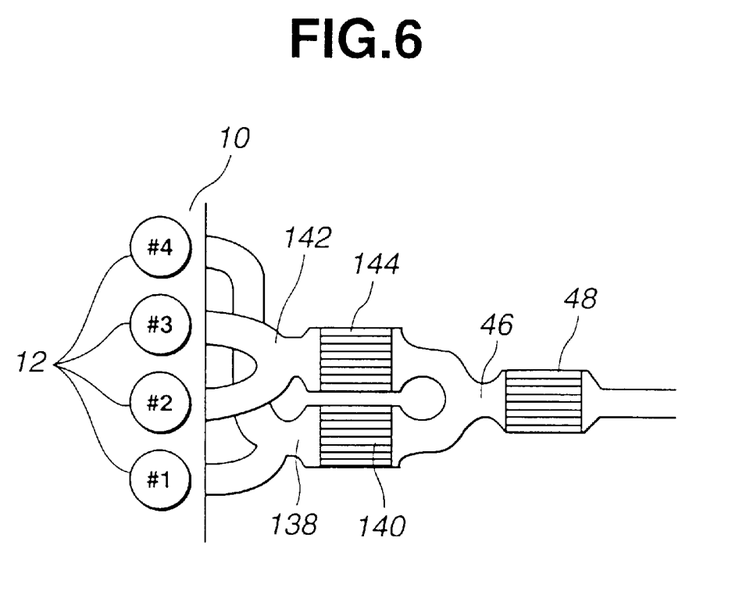
FIG. 6 illustrates a second embodiment of the device.

Referring to FIG. 6, a second embodiment of the present invention now is explained. The second embodiment differs in the cylinder groups and the exhaust system connected thereto, from the first embodiment. Like reference numerals denote like parts and therefore detailed explanations therefor are omitted.

As illustrated in FIG. 6, the first group including the engine cylinders #1 and #4 is connected with a first exhaust passage 138 and the second group including the engine cylinders #2 and #3 is connected with a second exhaust passage 142. The first exhaust passage 138 and the second exhaust passage 142 have two branches, respectively. A first front catalyst 140 is disposed in the first exhaust passage 138 and a second front catalyst 144 is disposed in the second exhaust passage 142. The first and second front catalysts 140 and 144 may be three-way catalysts having substantially same volumetric capacity. The first and second front catalysts 140 and 144 may be of a homogeneous type having the same oxidation property. The oxidation property of the first front catalyst 140 may be lower than that of the second front catalyst 144. Both the engine cylinders #1 and #4 or either #1 or #4 can be subjected to the rich spike control for reducing the NOx trapped by the rear catalyst 48. With this arrangement, the exhaust gases generated from the engine cylinders #1, #4 of the first cylinder group and the exhaust gases generated from the engine cylinders #2 and #3 of the second cylinder group are isolated from each other. The exhaust gases, therefore, can be prevented from interference therebetween. The arrangement of this embodiment can be more effective than that of the first embodiment from the viewpoint of the engine output. The two cylinder groups #1, #4 and #2, #3 can be alternately subjected to the rich spike control. In such the case, the oxidation property of the first front catalyst 140 may be same as that of the second front catalyst 144.

Figure 7:
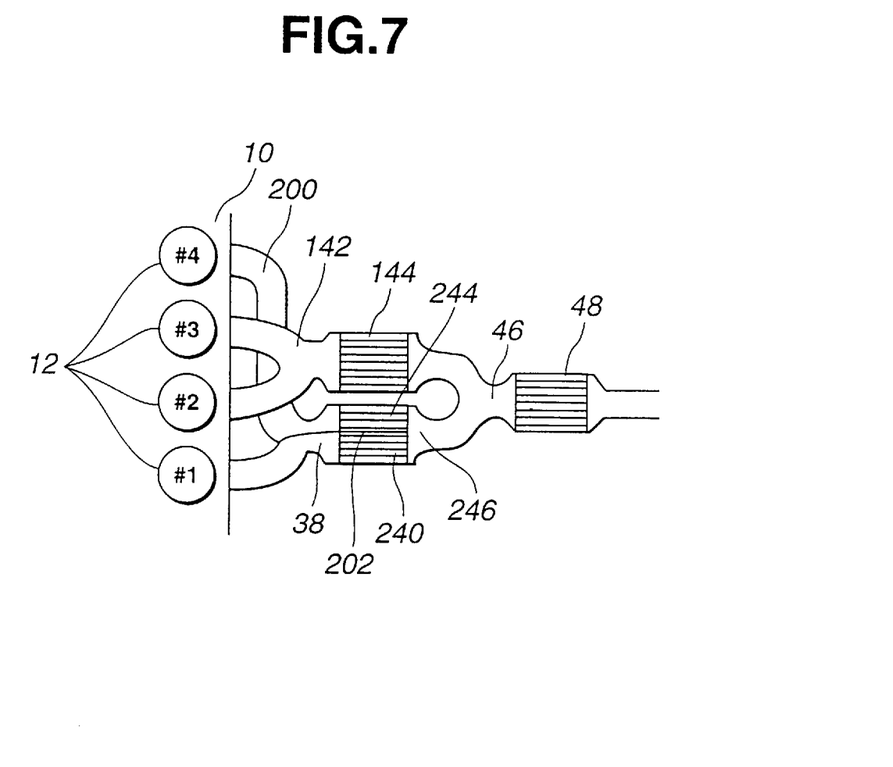
FIG. 7 illustrates a third embodiment of the device.

Referring to FIG. 7, there is shown a third embodiment of the present invention, which is a modification of the second embodiment.

As illustrated in FIG. 7, the engine cylinder #1 is connected with the exhaust passage 38 in which a first front catalyst 240 is disposed. Similar to the second embodiment, the engine cylinders #2 and #3 are connected through the respective branched passages with the common exhaust passage 142 in which the front catalyst 144 is disposed. The engine cylinder #4 is connected with a separate exhaust passage 200 in which a separate front catalyst 244 is disposed. The front catalysts 144 and 244 constitute the second front catalyst arranged in parallel to the first front catalyst 240. The exhaust passages 38 and 200 join to form a common passage portion 246 at outlets of the front catalysts 240 and 244. These front catalysts 240 and 244 may be formed separately or by dividing one catalyst into two catalyst portions having substantially same volumetric capacity by an internal partition 202. The front catalysts 240 and 244 have equivalent oxidation properties. Incidentally, the total volumetric capacity of these front catalysts 240 and 244 is equal to the volumetric capacity of the front catalyst 144. The oxidation property of the first front catalyst 240, therefore, is lower than the total of the oxidation properties of the front catalysts 144 and 244. With this arrangement, the reduction of the NOx can be effectively performed by supplying the engine cylinder #1 with the air-fuel mixture the rich A/F ratio upon the rich spike control. Similar to the second embodiment, the arrangement of this embodiment can prevent the interference between the exhaust gases generated from the separate cylinder groups and therefore it can be more effective from the viewpoint of the engine output.

Figure 8:
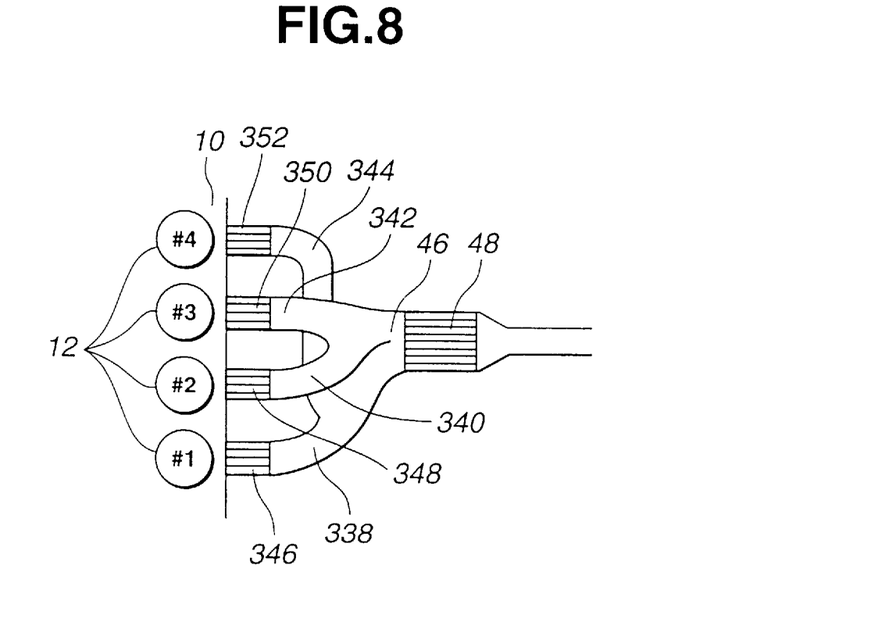
FIG. 8 illustrates a fourth embodiment of the device.

Referring to FIG. 8, a fourth embodiment of the present invention will be explained hereinafter. In the fourth embodiment, one of the engine cylinders constitutes the first cylinder group to be supplied with the air-fuel mixture having the rich A/F ratio upon the rich spike control, while the remainders of the engine cylinders constitute the second cylinder group to be not supplied with the air-fuel mixture having the rich A/F ratio thereupon. The rich spike engine cylinder is periodically shifted one another.

FIG. 8 shows an example in which the engine cylinder #1 among the four engine cylinders #1–#4 is to be first supplied with the air-fuel mixture having the rich A/F ratio upon the rich spike control and be periodically and sequentially shifted, for instance, in the order of #2, #3 and then #4. Front three-way catalysts 346, 348, 350 and 352 are disposed corresponding to the engine cylinders #1–#4, respectively, in exhaust passages 338, 340, 342, and 344, respectively. In this embodiment, the front catalyst 346 forms the first front catalyst and the three front catalysts 348, 350 and 352 form the second front catalyst. Each of the front catalysts 346–352 is arranged near the exhaust port 36, shown in FIG. 1, of the corresponding engine cylinder #1–#4 for the purpose of the early activation immediately after the engine starting up. The front catalysts 346–352 have the same oxidation property. Further, since the fuel injectors 14 and the front catalysts 346–352 can be used sequentially at predetermined frequency, the deterioration thereof due to continuous use can be uniformly restricted.

Figure 9:
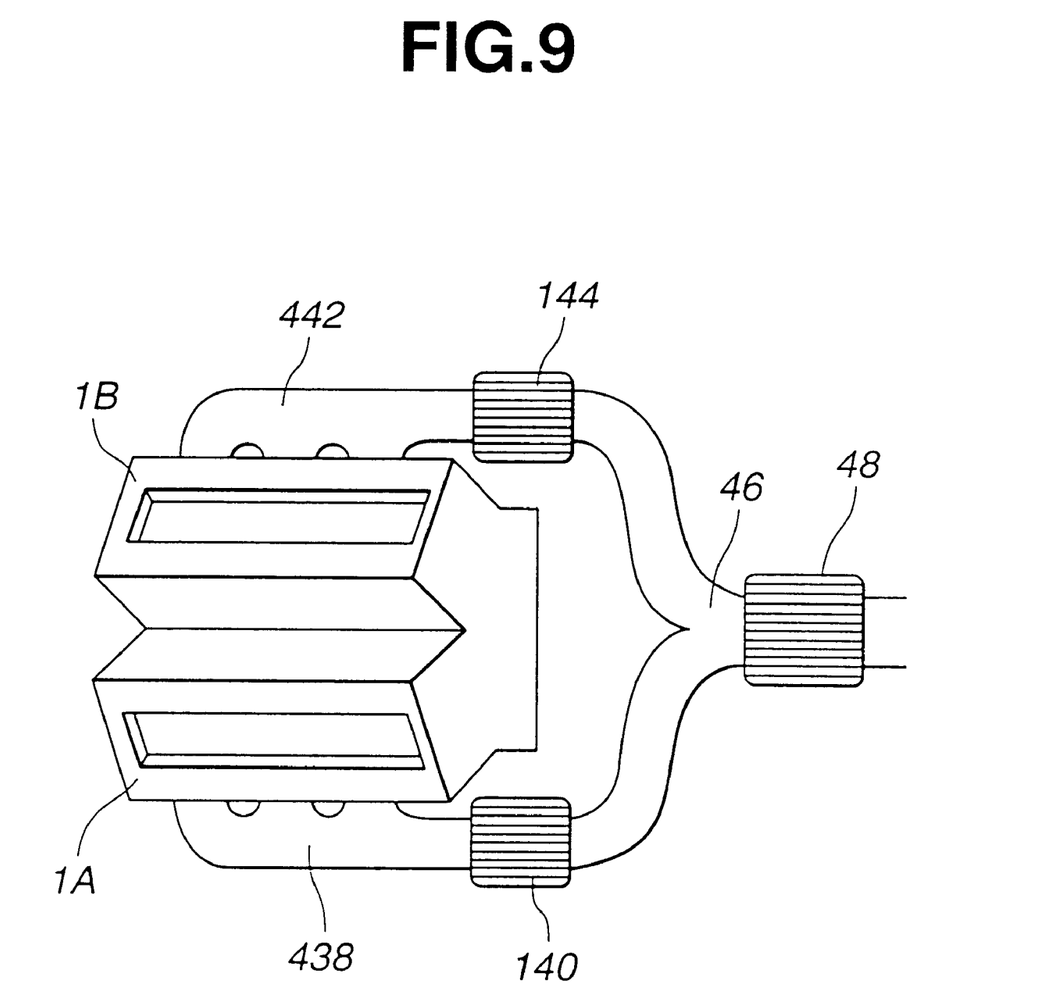
FIG. 9 illustrates a fifth embodiment of the device.

Referring now to FIG. 9, there is shown a fifth embodiment of the present invention, which is applied to a V-type six-cylinder engine.

In this embodiment, the first cylinder group is located on the left cylinder bank 1A and the second cylinder group is located on the right cylinder bank 1B. For simple illustration, three engine cylinders of each of the first and second cylinder groups are not shown in FIG. 9. The three engine cylinders of the first cylinder group are connected with a three-branched first exhaust passage 438 and the three engine cylinders of the second cylinder group are connected with a three-branched second exhaust passage 442. The first and second front catalysts 140 and 144 similar to those of the second embodiment, are disposed in the first and second exhaust passages 438 and 442. The first and second front catalysts 140 and 144 can be of a homogeneous type having the same oxidation property. Otherwise, the oxidation property of one of the first and second front catalysts 140 and 144 may be lower than the oxidation property of the other.

The contents of Japanese Patent Application No. P11-25659 filed on Feb. 03, 1999, is incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An exhaust gas purification device for an engine, comprising:

a first front catalyst disposed in a first exhaust passage connected to a first cylinder group, said first front catalyst being adapted to trap oxygen present in exhaust gas flowing thereinto when an air-fuel ratio of the exhaust gas is lean relative to a stoichiometric air-fuel ratio and oxidize a reducing agent present in the exhaust gas by the oxygen trapped thereby when the air-fuel ratio of the exhaust gas is rich relative to the stoichiometric air-fuel ratio;

a second front catalyst disposed in a second exhaust passage connected to a second cylinder group, said second front catalyst being adapted to trap oxygen present in exhaust gas flowing thereinto when an air-fuel ratio of the exhaust gas is lean relative to the stoichiometric air-fuel ratio and oxidize the reducing agent present in the exhaust gas by the oxygen trapped thereby when the air-fuel ratio of the exhaust gas is rich relative to the stoichiometric air-fuel ratio;

a rear catalyst disposed in a rear exhaust passage which combines the exhaust of the first and second exhaust passages, said rear catalyst being adapted to trap nitrogen oxides (NOx) present in exhaust gas flowing thereinto when an air-fuel ratio of the exhaust gas is lean relative to the stoichiometric air-fuel ratio and reduce the NOx trapped thereby by the reducing agent present in the exhaust gas when the air-fuel ratio of the exhaust gas is rich relative to the stoichiometric air-fuel ratio; and a controller programmed to make the air-fuel ratio of the exhaust gas flowing into the first front catalyst rich relative to the stoichiometric air-fuel ratio and make the air-fuel ratio of the exhaust gas flowing into the second front catalyst a stoichiometric air-fuel ratio when the NOx trapped by the rear catalyst is reduced.

2. An exhaust gas purification device as claimed in claim 1, wherein an oxidation property of the first front catalyst is lower than an oxidation property of the second front catalyst.

3. An exhaust gas purification device as claimed in claim 2, wherein the first front catalyst has contents of ceria (cerium oxide) smaller than contents of ceria in the second front catalyst.

4. An exhaust gas purification device as claimed in claim 2, wherein the first cylinder group is constituted by one cylinder.

5. An exhaust gas purification device as claimed in claim 2, wherein the first cylinder group includes a plurality of cylinders.

6. An exhaust gas purification device as claimed in claim 1, wherein the controller is programmed to make an air-fuel ratio of an air-fuel mixture produced at the first cylinder group rich and make an air-fuel ratio of an air-fuel mixture produced at the second cylinder group a stoichiometric air-fuel ratio.

7. An exhaust gas purification device as claimed in claim 6, wherein the controller is programmed to provide fuel injection to the first cylinder group at a period of time from an expansion stroke to an exhaust stroke upon making the air-fuel ratio of the air-fuel mixture produced at the first cylinder rich.

8. An exhaust gas purification device as claimed in claim 1, wherein an oxidation property of the first front catalyst is substantially same as an oxidation property of the second front catalyst.

9. An exhaust gas purification device as claimed in claim 8, wherein the controller is programmed to periodically shift one engine cylinder among the first and second cylinder groups that is subjected to making the exhaust gas generated therefrom rich, from one to another.

10. An engine with an exhaust gas purification device, comprising:

a plurality of engine cylinders divided into a first cylinder group and a second cylinder group;

a first exhaust passage connected to the first cylinder group;

a second exhaust passage connected to the second cylinder group;

a common exhaust passage merging the first and second exhaust passages and disposed downstream thereof;

a first catalyst disposed in the first exhaust passage;

a second catalyst disposed in the second exhaust passage;

a nitrogen oxide (NOx) trapping catalyst disposed in the common exhaust passage;

fuel injectors connected to the engine cylinders; and a controller connected to the fuel injectors and programmed to control fuel injection for making an air-fuel ratio of exhaust gas flowing into the first catalyst rich relative to a stoichiometric air-fuel ratio, wherein the program is executed when an amount of the NOx trapped by the NOx trapping catalyst reaches a predetermined value at which the NOx trapped by the NOx trapping catalyst is to be reduced, wherein the controller is programmed to control at the same time, fuel injection for making an air-fuel ratio of exhaust gas flowing into the second catalyst a stoichiometric air-fuel ratio.

11. An engine as claimed in claim 10, wherein the NOx trapping catalyst is operative to trap NOx present in exhaust gas flowing thereinto when an air-fuel ratio of the exhaust gas is lean relative to a stoichiometric air-fuel ratio and reduce the NOx trapped thereby by the reducing agent present in the exhaust gas when the air-fuel ratio of the exhaust gas is rich relative to the stoichiometric air-fuel ratio.

12. An engine as claimed in claim 10, wherein said controller is programmed to conduct an additional fuel injection at the first cylinder group at a period of time from an expansion stroke to an exhaust stroke.

13. An engine as claimed in claim 10, wherein the predetermined value is approximately a half of a saturated amount of the NOx.

14. An engine as claimed in claim 10, wherein the first and second catalysts are operative to trap oxygen present in exhaust gas flowing thereinto when an air-fuel ratio of the exhaust gas is lean relative to a stoichiometric air-fuel ratio and oxidize a reducing agent present in the exhaust gas by the oxygen trapped thereby when the air-fuel ratio of the exhaust gas is rich relative to the stoichiometric air-fuel ratio.

15. An engine as claimed in claim 14, wherein the first cylinder group includes two or more engine cylinders.

16. An engine as claimed in claim 15, wherein an oxidation property of the first catalyst is substantially same as an oxidation property of the second catalyst.

17. An engine as claimed in claim 15, wherein an oxidation property of the first catalyst is lower than an oxidation property of the second catalyst.

18. An engine as claimed in claim 14, wherein the first cylinder group is constituted by one engine cylinder.

19. An engine as claimed in claim 18, wherein an oxidation property of the first catalyst is lower than an oxidation property of the second catalyst.

20. An engine as claimed in claim 19, wherein the first catalyst has contents of ceria (cerium oxide) smaller than contents of ceria in the second catalyst.

21. An engine as claimed in claim 18, wherein the second catalyst is constituted by a plurality of catalysts.

22. An engine as claimed in claim 21, wherein the plurality of catalysts of the second catalyst are disposed near exhaust ports of the engine cylinders of the second cylinder group.

23. An engine as claimed in claim 22, wherein the controller is programmed to periodically shift the one engine cylinder from one to another.

24. A method for controlling an air-fuel ratio of exhaust gas generated from engine cylinders and flowing into a first and second catalyst arranged in parallel upstream of a nitrogen oxide (NOx) trapping catalyst, said first and second catalyst being operative to trap oxygen present in the exhaust gas flowing thereinto and oxidize a reducing agent present in the exhaust gas by the trapped oxygen, said method comprising:

calculating a basic injection fuel amount required to be injected into each engine cylinder for making an air-fuel ratio of an air-fuel mixture to be combusted a stoichiometric air-fuel ratio;

determining an optimal ignition timing based on the basic injection fuel amount calculated; and calculating an additional injection fuel amount required to be injected into a predetermined engine cylinder at a predetermined period of time for making an air-fuel ratio of the exhaust gas generated from the predetermined engine cylinder and flowing into the NOx trapping catalyst rich, wherein when an amount of the NOx trapped by the NOx trapping catalyst reaches a predetermined value at which the NOx trapped by the NOx trapping catalyst is to be reduced, the air-fuel ratio of exhaust flowing into the first catalyst is controlled to be rich relative to a stoichiometric air-fuel ratio, and the air-fuel ratio of exhaust flowing into the second catalyst is controlled to be a stoichiometric air-fuel ratio.

25. A method as claimed in claim 24, wherein the predetermined period of time is a period from an expansion stroke to an exhaust stroke at the predetermined engine cylinder.

26. A method as claimed in claim 24, further comprising periodically shifting one of the engine cylinders as said predetermined engine cylinder to another.

* * * * *